United States Patent
Liu et al.

(10) Patent No.: US 6,353,893 B1
(45) Date of Patent: Mar. 5, 2002

(54) SLEEP MODE INDICATOR FOR A BATTERY-OPERATED DEVICE

(76) Inventors: Christine Liu; Jonathan Liu; Constance Liu, all of 20397 Via Napoli, Cupertino, CA (US) 95014

(*) Notice: Subject to any disclaimer, the term of this patent is extended or adjusted under 35 U.S.C. 154(b) by 0 days.

(21) Appl. No.: 09/317,742

(22) Filed: May 24, 1999

(51) Int. Cl.$^7$ .............................. G06F 1/26; G06F 1/28; G06F 1/30
(52) U.S. Cl. ...................... 713/323; 713/320; 713/324
(58) Field of Search ............................... 713/300–340; 714/14, 22, 24

(56) References Cited

U.S. PATENT DOCUMENTS

| | | | |
|---|---|---|---|
| 5,065,357 A | * 11/1991 | Shiraishi et al. | 713/321 |
| 5,692,203 A | * 11/1997 | Grodevant | 713/323 |
| 5,697,717 A | * 12/1997 | Kaneko et al. | 400/703 |
| 5,714,870 A | * 2/1998 | Dunstan | 713/321 |
| 5,754,868 A | * 5/1998 | Yamamoto et al. | 713/300 |
| 5,938,772 A | * 8/1999 | Welch | 713/320 |

FOREIGN PATENT DOCUMENTS

EP         0978767 A1  *  9/2000  .......... G03G/15/00

* cited by examiner

Primary Examiner—Rupal Dharia

(57) ABSTRACT

A new and useful sleep mode indicator system for laptop computers provides efficient use of battery power. In sleep mode, this indicator system turns OFF the typical blinking LED during the user-specified periods of unavailability. For example, a computer in sleep does not need to use electricity to identify its sleep mode status while its user is also asleep or is otherwise unavailable. This indicator system collects periods of unavailability and turns OFF the blinking LED during those periods. Also, sometimes the user may intend to operate the computer during a previously specified period of unavailability. This is reflected by the computer not in sleep mode at the start of the period and later enters temporarily into the sleep mode inside that specified period. Assuming that being the case, the present invention skips the period of unavailability just for that day. Further, the indicator system is not turned OFF any more for the rest of the specified period for that particular day.

7 Claims, 5 Drawing Sheets

SLEEP MODE INDICATOR FOR A BATTERY-OPERATED DEVICE

FIELD OF THE INVENTION

Our invention has to do with the features of electrical devices that save battery power. Also, more specifically, this invention describes an electrical arrangement to save battery power for a laptop computer. Even more specifically, this invention describes a new and useful sleep-mode indicator system for the laptop computer.

BACKGROUND INFORMATION

Portable devices such as portable computers, personal digital assistants (PDAs), and cellular telephones are very common products today. They, like other portable devices, are primarily designed to operate in different locations and under various environmental conditions. Unlike equipment designed to operate in a fixed location such as a desk top computer, a portable device relies mostly on portable power supply such as batteries for operation. For such a device, electrical power usage is always a significant concern. The more a portable device uses electrical power per unit time, the faster its battery power supply is drained. On the one hand, factors such as internal circuit elements, device shape and size to a great extent determine how much electrical power per unit time is needed to operate the device. On the other hand, power usage is a significant concern also because its battery power continues to be drained whenever the device is ON. This holds true whether or not the entire device is being operated on at the time or is being left idle and unused.

Saving electrical power has been a very important goal ever since the birth of battery-operated portable devices. For example, for laptop computers, one efficient way is to apply battery power only to the parts of a device in use, and at the same time to withhold power from those parts of a device not in use. The early portable devices, however, had a simple ON/OFF arrangement in which full battery power was available for use when the devices were ON and the battery power was completely shut off when the devices were OFF. Information such as re-usable programs and data saved in the semiconductor memories became lost once the devices were turned OFF. To use the programs and data again, additional power and time must be used to load them back into the semiconductor memories. Some later portable device used non-volatile semiconductor memories so that the saved information remains intact even when the devices were turned OFF; some other portable devices used stand-by power adapted to keep the memories refreshed when the devices were OFF.

Today's laptop computers have complicated circuitry because of their additional peripheral units such as floppy disk, hard disk, PCMCIA and CD drives. To efficiently manage the use of electrical power, arrangements have been devised to monitor various functions inside a laptop computer. The computer is intelligent enough to apply battery power only to internal circuits and sub-systems that are deemed 'in use' and at the same time to withhold power from those circuits and sub-systems that are deemed 'idle'. Sometimes the power is not completely withheld from the 'idle' circuitry but the power supply is merely reduced due to its entry into a low power consumption mode. Either way, the power management arrangement inside the laptop computer maximizes the computer's power savings and lengthens the duration the laptop computer can operate using batteries.

The electrical state of the computer when the power management arrangement deprives or reduces electrical power supplied to the 'idle' circuitry and sub-systems is generally referred to as the sleep mode. During sleep mode, the arrangement further monitors the activities in the computer in order that power can be applied immediately when needed. One way a laptop computer enters into the sleep mode is through user inaction. For example, when there is no user key entry for a pre-determined duration, display circuitry and related-subsystems are then shut off, and relevant programs and data are saved. Another way is through user issuance of a sleep command, and another way is through the detection of battery charge below a set level.

A blinking sleep-mode indicator typically identifies to users that the laptop computer is in sleep mode. One such indicator is a blinking LED located on computer housing for convenient observation. To awaken the computer from sleep mode, a typical way is by pressing any key on the keyboard. In this manner, relevant programs and data need not be re-loaded from hard disk and power to an otherwise idle display is conserved.

Unfortunately, once the computer enters into sleep mode, the sleep-mode indicator system is turned ON, and the indicator LED will and continue to blink until the computer exits the sleep mode. The computer does not have any intelligence in knowing when to leave ON the indicator system and when to turn it OFF during sleep mode. For example, better intelligence is needed during sleep mode in the situations where the user has gone to sleep or is otherwise unavailable for a lengthy period of time. Such intelligence can allow the computer to shut down the indicator system even during sleep mode. In this manner, although the power saving over any single day might be miniscule, however, the power savings would be very significant for many users who prefer to have their computers ON day in and day out.

SUMMARY OF THE INVENTION

Therefore, it is an aspect of the present invention to provide better intelligence to an electrical device such as a laptop computer as to when during sleep mode the user is unavailable to operate the device. Briefly, an arrangement is provided to allow a user to specify time periods of unavailability such as typical sleeping hours, lunch hour, etc. If a specified time period occurs during the device sleep mode, then the sleep-mode indicator system is turned OFF until the specified period is over.

It is another aspect of the present invention in that the sleep-mode indicator system is not turned OFF for a specified time period of a particular day should the device not be in sleep mode at the beginning time of the specified time period. Further, the indicator system is not turned OFF any more for the rest of the specified time period of that day should the computer is subsequently caused to exit sleep mode temporarily during that specified time period.

BRIEF DESCRIPTION OF THE DRAWINGS

A better understanding of the present invention can be obtained by considering the following detailed description taken together with the accompanying drawings that illustrate preferred embodiments of the present invention in which.

DETAILED DESCRIPTION OF THE PREFERRED EMBODIMENTS

With today's advances in technology, the design of specialized integrated circuits and programmable logic generally do not require the rendering of fully detailed circuit diagrams. The definition of logic functionality allows computer design techniques to design the desired logic and circuits. Additionally, micro-controllers are known to operate based on a desired flow chart diagram rendered into software that is compatible with a selected micro-controller. Accordingly, portions of the present invention will be described primarily in terms of functionality to be implemented by a micro-controller and other associated electronic components. This functionality will be described in detail with the associated flow chart diagram. Those of ordinary skill in the art, once given the following descriptions of the various functions to be carried out by the present invention will be able to implement the necessary micro-controller structure and logic for various logic devices or custom designed integrated circuits in suitable technologies without undue experimentation.

Figure 1:
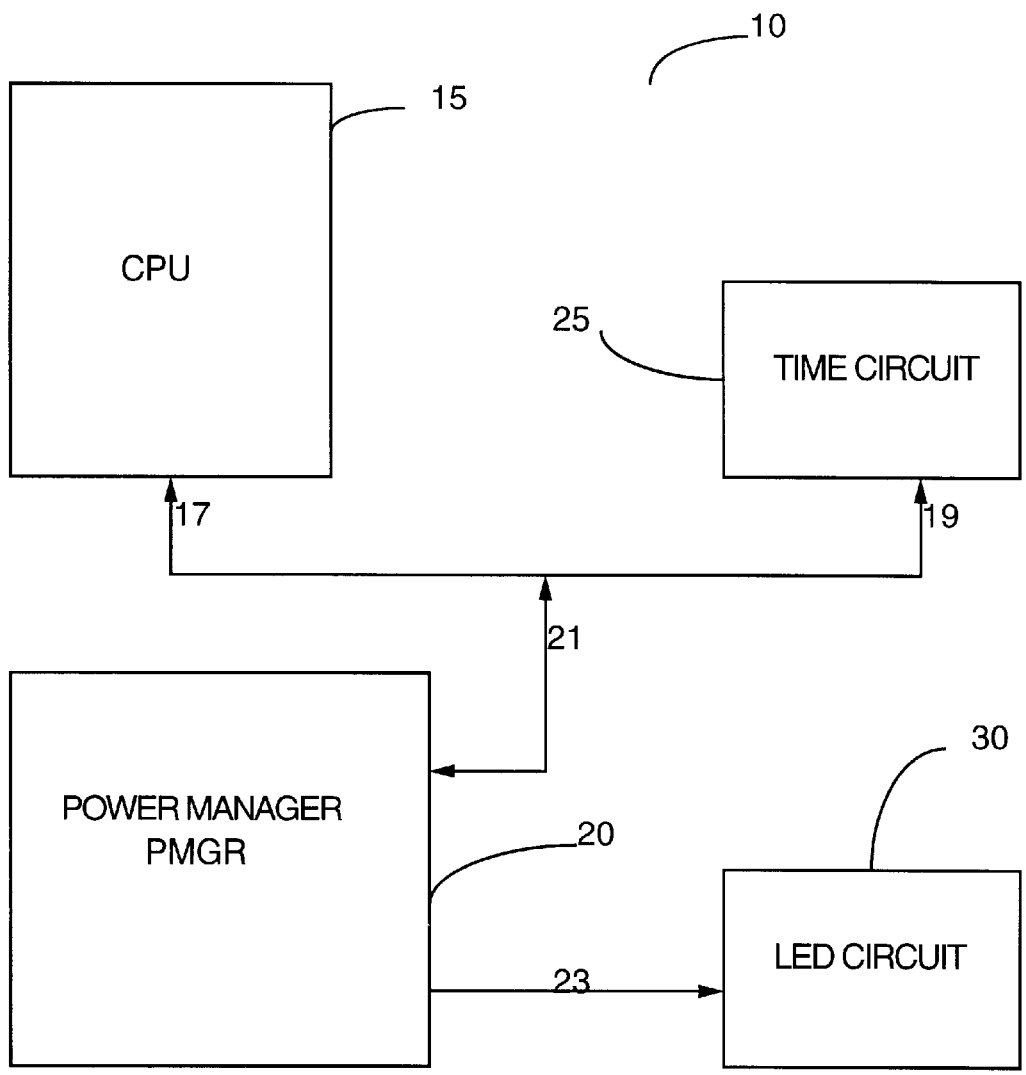
FIG. 1 is a functional block diagram of the parts of a laptop computer generally pertaining to the power management function of the present invention.

Referring to FIG. 1, a simplified overview of a partial laptop computer system 10 that is related to the present invention is shown in functional block diagram format. While FIG. 1 is useful for providing an overall description of the sleep-mode indicator system of the present invention, a number of details of the system are not shown. As necessary for disclosure of the present invention, further detail is set forth with reference to other figures provided with this specification.

The partial laptop computer system 10 includes a CPU 15, a micro-controller power manager (PMGR) 20, a time circuit 25 and a LED circuit 30. The CPU 15 is electrically coupled to PMGR 20 via lines 17,21 and coupled to the time circuit 25 via lines 17, 19. The LED circuit 30 is electrically coupled to PMGR 20 via line 23. The lines 17, 19, 21 and 23 each may represent a collection of electronic lines adapted to ensure the proper working of the laptop computer. The LED circuit 30 includes a LED (not shown) and an associated circuit (not shown) for generating a sleep mode status indicator signal which may cause a LED blinking effect. Depending on the design, it is possible to incorporate the associated circuit for the LED blinking effect inside the PGMR 20. The PMGR 20 is an intelligent assistant to the CPU 15, wherein PMGR 20 may monitor the state of charge of battery, control the power usage of the various subsystems or may even interface to I/O devices such as a modem or a serial card. PGMR may consist of or be a portion of an ASIC. The time circuit 25 includes circuitry for generating and storing the time of the day information. The time information is accessed by PMGR 20 via lines 19 and 21. Also, in some designs, the time circuit 25 may be physically located on the same ASIC chip as the PMGR 20.

The main processor for the laptop computer system 10 is the CPU 15. During sleep mode, the CPU 15 may become inactive and enter into a low-power consumption mode. For example, to minimize power usage, power or the clock signal to the CPU 15 may be turned OFF or the clock frequency feeding to the CPU 15 might be reduced. Further, once the computer goes to sleep, the PMGR 20 takes over the bulk of the sleep mode processing tasks. One of the tasks PMGR 20 does at the start of the sleep mode is to immediately turn the LED circuit 30 ON. As a result, the LED circuit 30 generates and display a sleep mode status indicator signal so that the LED might be blinking on the housing of the laptop computer to indicate to users that this computer is now in sleep mode.

The present invention discloses a sleep-mode indicator system wherein the indicator system is turned OFF during sleep mode for a user-specified time period of unavailability. Some portions of the detailed description are presented in terms of algorithmic flow chart steps. These algorithmic descriptions are the means used by those skilled in the data processing arts to most effectively convey the substance of their work to others skilled in the art. An algorithm is here, and generally, conceived to be a self-consistent sequence of steps leading to a desired result.

Figure 2:
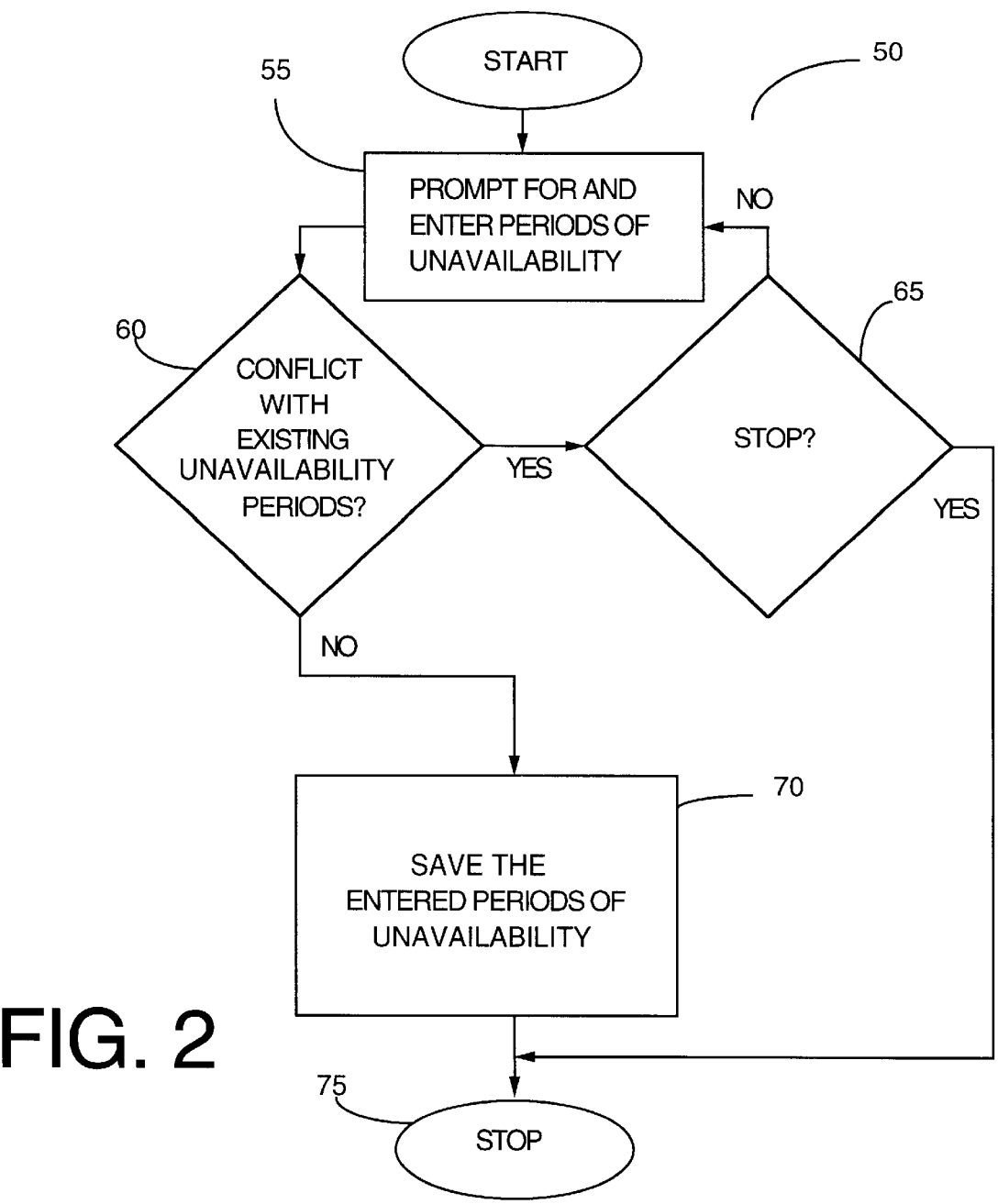
FIG. 2 is a flow chart diagram that illustrates the specifying of the time periods of user unavailability of the present invention.

Now, FIG. 2 in conjunction with FIG. 1 discloses the designation of the unavailability period aspect of the present invention. This set-up logic may be implemented in either software or hardware. In either case, this algorithm 50 is to be executed while the laptop computer is not in sleep mode. However, for Macintosh computer systems made by Apple Computer, Inc., this logic is preferably implemented in software such as in the form of a control panel. When the algorithm 50 is executed, step 55 may preferably cause a dialog box to prompt for the beginning and ending times of a period during which the user is typically unavailable, for example, sleeping hours, lunch, dinner and happy hours. Since there may be more than one period of unavailability over the course of one day, step 60 checks for conflicts between the newly-entered times and the already-entered and previously-saved times. Conflict rules may be that there is not to be any overlap of periods of unavailability. Once a conflict is found, step 65 prompts the user as to whether to stop and leave this algorithm or to return to step 55 for another entry attempt. If step 60 determines that there is no conflict, then step 70 causes the CPU 15 to save the entered time information. The information may be saved in any memory device; however, it is preferable to save the information in the memory registers of the PMGR 20.

Figure 3:
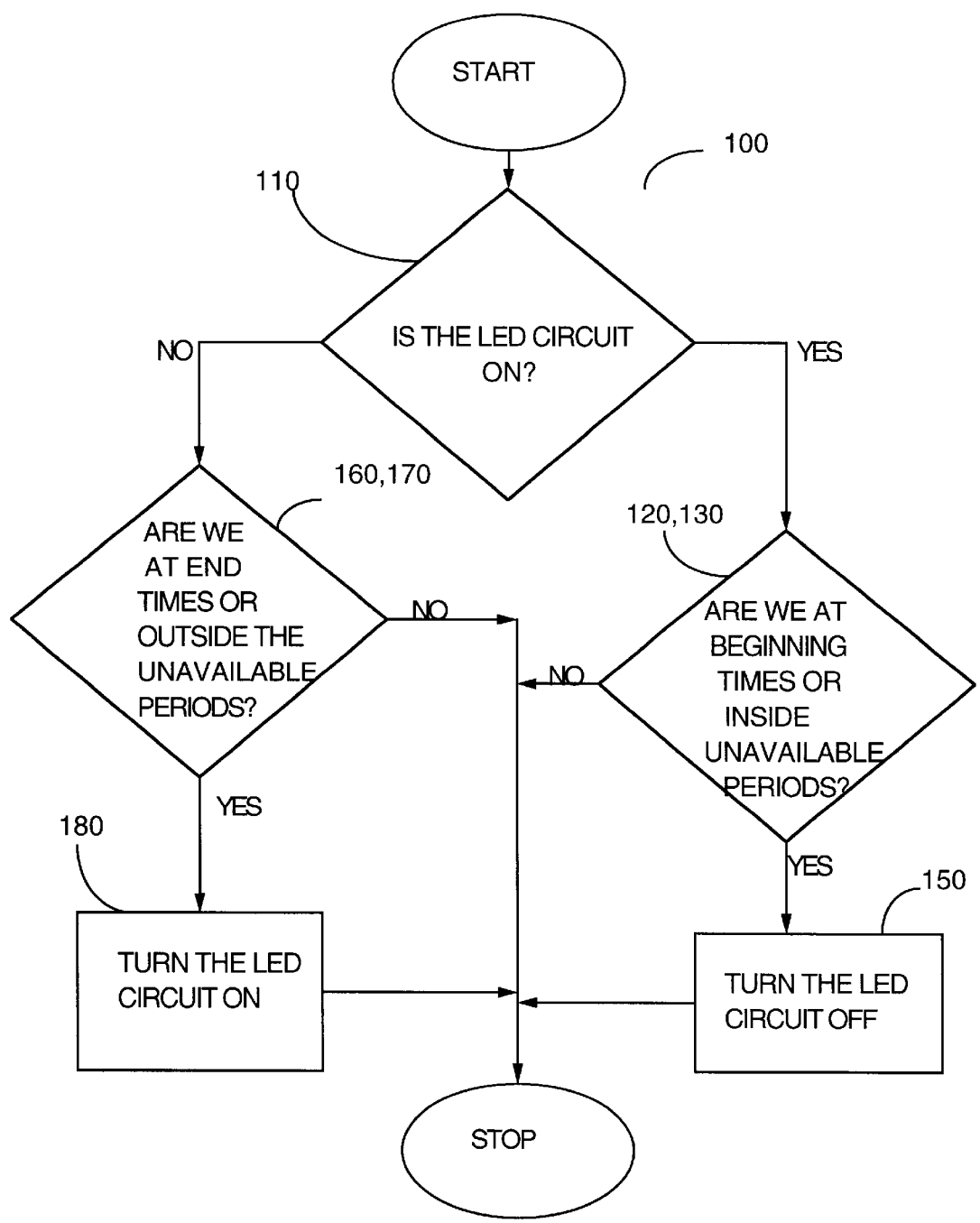
FIG. 3 is a flow chart diagram that illustrates the sleep-mode indicator system according to a preferred embodiment of the present invention.

Referring now to FIG. 3 in conjunction with FIG. 1, there is provided an arrangement for turning the LED circuit 30 ON or OFF during sleep mode. PMGR 20 may process a variety of tasks during sleep mode; one of which is monitoring for 'wake up' interrupts from I/O, e.g., the keyboard. Once the handshake between the CPU 15 and the PMGR 20 settles and the sleep mode is entered, algorithm 100 is one of the tasks processed and preferably polled by PMGR 20 during sleep mode. If polled by PMGR 20, it is preferable for its polling to occur at least once a minute.

Typically, once sleep mode occurs, the LED circuit 30 is immediately turned ON (not shown). However, the present invention allows the LED circuit to be OFF during sleep, and therefore, step 110 of algorithm 100 causes PMGR 20 to determine whether the LED circuit 30 is ON. On the one hand, if ON, steps 120 and 130 cause PMGR 20 to access the current time of the day information from the time circuit 25 and compare it against the periods of unavailability already saved in the PMGR 20 registers. If the current time is the same as any of the saved beginning times of the periods of unavailability, or it is inside of those saved periods, then step 150 turns the LED circuit 30 OFF. On the other hand, if the LED circuit 30 is OFF, steps 160 and 170 cause PMGR 20 to access the current time information again from the time circuit 25 and again to compare it against the periods of unavailability already saved in the PMGR 20 registers. If the current time is the same as any of the saved ending times of the periods of unavailability, or it is outside all of those periods, then step 180 turns the LED circuit 30 ON. In this manner, the blinking LED may be turned OFF in sleep mode while the user is most likely unavailable and therefore not having the need to observe the blinking LED. Similarly, the blinking LED may be turned back ON in sleep mode while the user has become again available and therefore now wanting to be reminded by the blinking LED. In sum, the electrical or battery power is more efficiently utilized. It is especially true for those users who as a habit prefer to leave their computer systems in sleep mode even during their sleep, lunch, dinner, and happy hours.

Figure 4A:
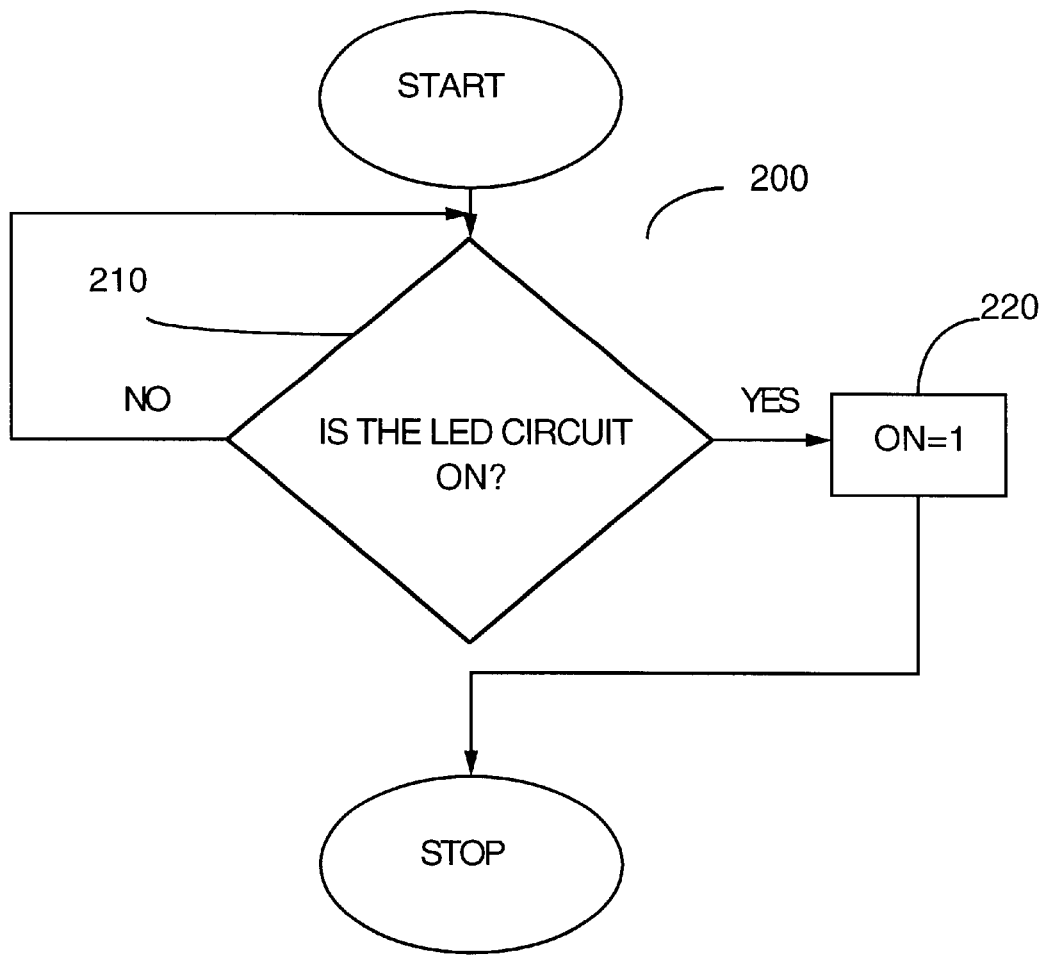
FIG. 4A is a flow chart diagram that illustrates an aspect of the sleep-mode indicator system according to another preferred embodiment of the present invention.
Figure 4B:
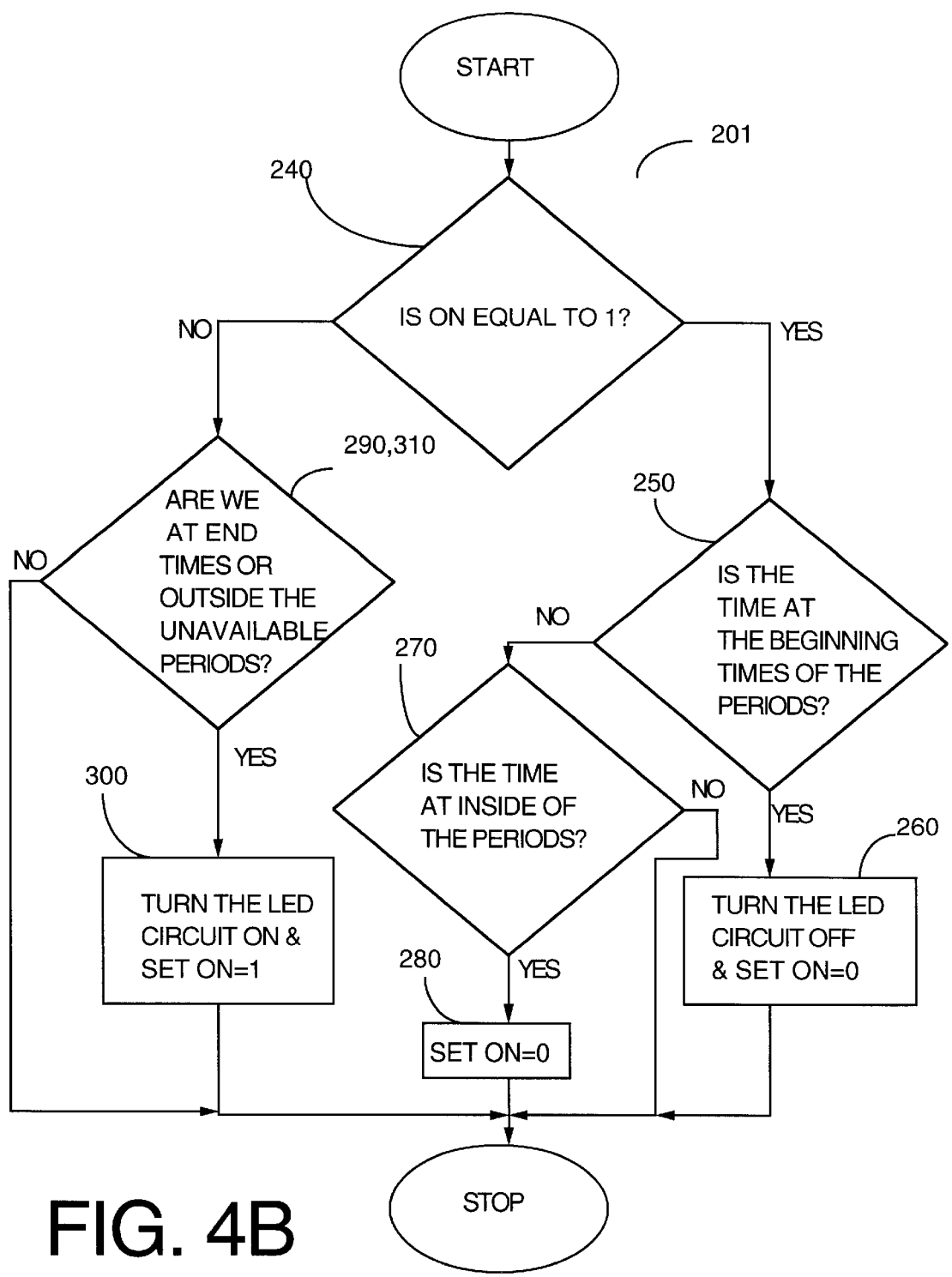
FIG. 4B is a flow chart diagram that illustrates another aspect of the sleep-mode indicator system according to another preferred embodiment of the present invention.

FIG. 4A and FIG. 4B in conjunction with FIG. 1 describe another preferred embodiment of the present invention. The fact that sleep mode is entered inside a previously entered period of unavailability means the user intends to work through a portion of or may be even the entire previously-entered unavailability period for that particular day. Assuming that may be the case, therefore, if the sleep mode is entered inside the specified period, then algorithms 200 and 201 cancel the specified period just for that day. Algorithm 200 is preferably a part of the sleep mode initialization routines to be executed after the LED circuit 30 turn-ON signal has been issued. Alternatively, algorithm 200 may be included as a part of that initialization algorithm (not shown) that turns ON the LED circuit 30. Further, to save time and power, instead of a decision node 210, the ON flag can be simply be set to ONE immediately after the LED circuit 30 turn-ON initialization has been fully executed.

Immediately after the sleep mode is entered and a LED circuit turn-ON signal is issued, steps 210 and 220 appropriately set the LED ON flag depending on the current state of the LED circuit 30. Algorithm 200 initializes the ON flag, and it is executed once for each entry into the sleep mode. Typically, algorithm 201 is executed more than once for each sleep mode entry, again, preferably polled by the PMGR 20. On the one hand, if the ON flag is ONE, then step 240 will direct the logic flow to determine whether the LED circuit 30 should be turned OFF. Step 250 determines whether the current time is the same as any of the beginning times of the periods saved. If so, the LED circuit 30 is turned OFF, and the LED ON flag is appropriately set by step 260. Otherwise, step 270 checks to see whether the current time is inside any of the saved periods of unavailability. If so, algorithm 201 assumes that the user intends to use the computer through the entire period. Therefore, algorithm 201 cancels the period for that day by allowing step 280 to appropriately set the LED ON flag to direct the logic flow away from the command that would turn the LED circuit 30 OFF. Also as a result, the indicator system is not turned OFF any more for the rest of the specified period for that particular day.

On the other hand, if the ON flag is ZERO, then steps 290 and 310 cause PMGR 20 to access the current time information from the time circuit 25 and to compare it against the periods of unavailability already saved in the PMGR 20 registers. If the current time is the same as any of the saved ending times of the periods of unavailability, or it is outside all of those periods, then step 300 turns the LED circuit 30 ON and then appropriately sets the LED ON flag.

The foregoing description of preferred embodiments of the present invention have been presented for purposes of illustration and description. They are not intended to be exhaustive or to limit the invention to the precise forms disclosed, and obviously many modifications and variations are possible in light of the above teaching. It is intended that the scope of the invention be defined by the claims appended hereto and their equivalents.

We claim:

1. A method for turning OFF a sleep mode indicator system of a battery-operated device while the device is in sleep mode, the method including the steps of:

collecting periods of user unavailability while the device is not in sleep mode and saving beginning and ending times of the periods of user unavailability into memory;

turning ON the sleep mode indicator immediately after the device enters into sleep mode;

determining the current time of the day while in sleep mode and accessing the periods of user unavailability from the memory;

turning OFF the sleep mode indicator when the device is in sleep mode and when the current time of the day is the same as any of the beginning times of the periods of user unavailability or is inside any of the periods of user unavailability; and turning ON the sleep mode indicator when the device is in sleep mode and when the current time of the day is the same as any of the ending times of the periods of user unavailability or is outside all of the periods of user unavailability.

2. A method for turning OFF a sleep mode indicator system of a battery-operated device while the device is in sleep mode, the method including the steps of:

collecting periods of user unavailability while the device is not in sleep mode and saving beginning and ending times of the periods of user unavailability into memory;

turning ON the sleep mode indicator immediately after the device enters into sleep mode;

determining the current time of the day while in sleep mode and accessing the periods of user unavailability from the memory;

turning OFF the sleep mode indicator when the device is in sleep mode and when the current time of the day is the same as any of the beginning times of the periods of user unavailability;

leaving ON the sleep mode indicator when the device is in sleep mode and when the current time of the day is inside one of the periods of user unavailability, said leaving step further including leaving ON the sleep mode indicator for the rest of said one of the periods of user unavailability; and turning ON the sleep mode indicator when the device is in sleep mode and when the current time of the day is the same as any of the ending times of the periods of user unavailability or is outside all of the periods of user unavailability.

3. A sleep mode indicator system of a battery-operated device, the indicator system capable of being turned OFF in sleep mode, the indicator system comprising:

a CPU for collecting periods of user unavailability while the device is not in sleep mode and saving beginning and ending times of the periods of user unavailability into memory;

a time circuit for generating and storing current time of the day information;

a LED circuit for generating and displaying a sleep mode status indicator signal; and a power manager coupled to the CPU, the time circuit and the LED circuit for turning ON the LED circuit immediately after the device enters into sleep mode, for retrieving the current time of the day information from the time circuit while in sleep mode and accessing the periods of user unavailability from the memory, for turning OFF the LED circuit when the device is in sleep mode and when the current time of the day information is the same as any of the beginning times of the periods of user unavailability or is inside any of the periods of user unavailability, and for turning ON the LED circuit when the device is in sleep mode and when the current time of the day is the same as any of the ending times of the periods of user unavailability or is outside all of the periods of user unavailability.

4. A sleep mode indicator system as claimed in claim 3 wherein the battery-operated device includes a laptop computer.

5. A sleep mode indicator system as claimed in claim 3 wherein the power manager resides on an ASIC.

6. A sleep mode indicator system as claimed in claim 4 wherein the memory includes registers of the power manager.

7. A sleep mode indicator system as claimed in claim 3 wherein the sleep mode status indicator signal includes a LED blinking signal.

* * * * *